P. M. LEPROHON.
EGG-HOLDER.
No. 187,872.      Patented Feb. 27, 1877.
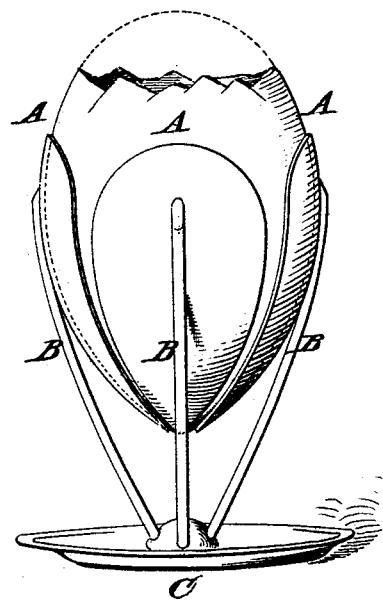

UNITED STATES PATENT OFFICE.

PANTALION M. LEPROHON, OF BROOKLYN, E. D., NEW YORK.

IMPROVEMENT IN EGG-HOLDERS.

Specification forming part of Letters Patent No. 187,872, dated February 27, 1877; application filed January 13, 1877.

*To all whom it may concern:*

Be it known that I, PANTALION M. LEPROHON, of Brooklyn, E. D., in the county of Kings and State of New York, have invented a new and Improved Egg-Holder, of which the following is a specification:

The accompanying drawing represents a perspective view of my improved egg-holder.

The invention has reference to an improved spring egg-holder, that forms an elegant and convenient device for table use; and it consists of clamping leaves or plates curved to the shape of an egg, and supported on spring arms or posts attached to a base-plate.

In the drawing, A represents one of the egg-holding leaves or plates, of which preferably four are arranged to support an egg. The leaves A are tapering toward their lower ends, and curved to fit the shape of a medium-sized egg. The leaves are supported on spring arms or posts B, that rise from the center of a foot or base plate, C, to which they are soldered. The egg is readily placed into the holder by pressing it into the same, with the thinner end downward, so as to cause thereby the leaves to spread and hug, by the spring action of the arms, the egg tightly between the same, holding it convenient for eating. The tulip-shaped cup formed by the leaves imparts to the holder an elegant and tasteful appearance, the same forming a neat article of silver or silver-plated table-ware.

The cup C serves as a drip-plate to receive the waste or leakage from the egg, where it may have been accidentally broken.

What I claim is—

A new article of manufacture, consisting of leaves A, supported in springs B, that converge toward, and are secured at their lower ends in, the center of a drip-plate, C, as shown and described.

PANTALION M. LEPROHON.

Witnesses:
PAUL GOEPEL,
C. SEDGWICK.